Jan. 1, 1929.    1,697,261
C. W. DAUGHS
STEAM CONNECTION
Original Filed June 14, 1926
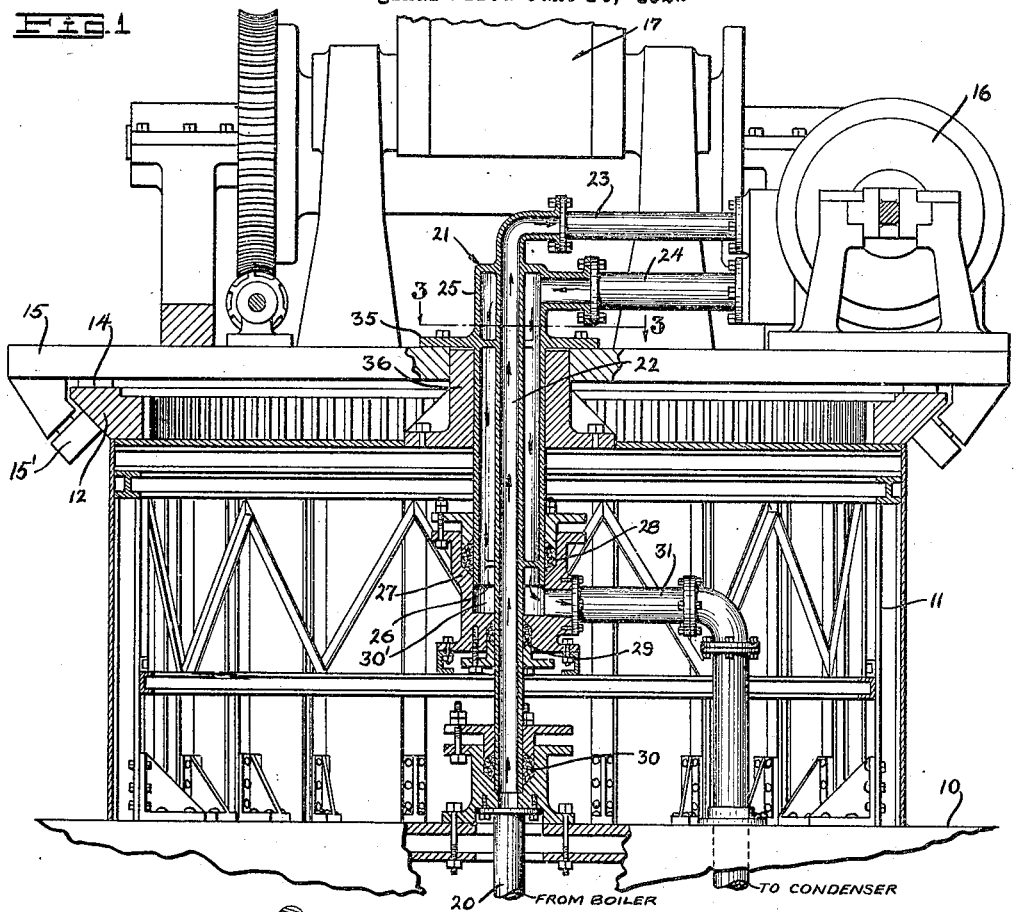
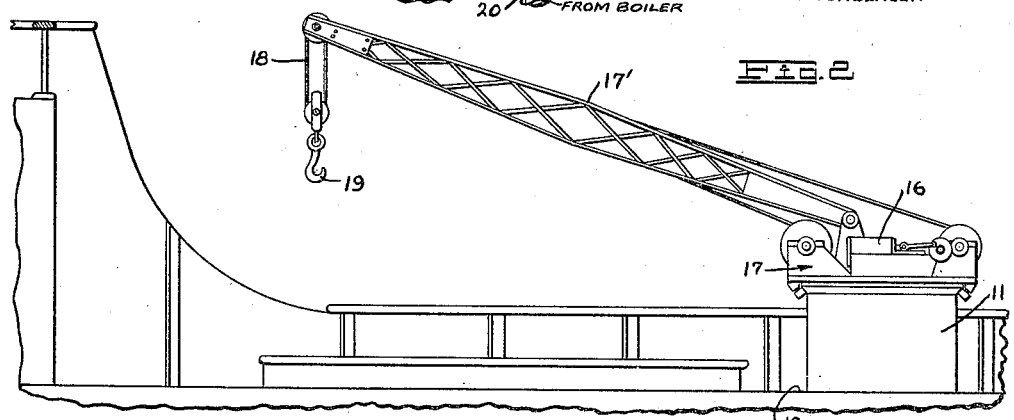
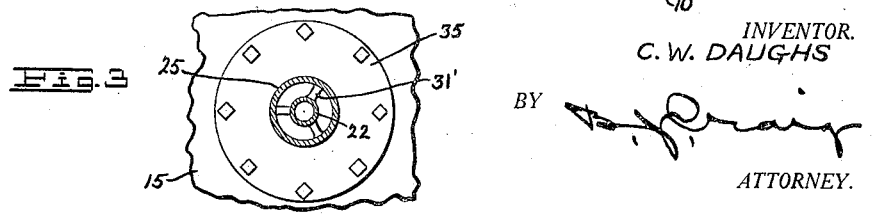
INVENTOR.
C. W. DAUGHS
BY
ATTORNEY.

Patented Jan. 1, 1929.

1,697,261

UNITED STATES PATENT OFFICE.

CHARLES W. DAUGHS, OF PORTLAND, OREGON, ASSIGNOR TO DAUGHS SHIP CRANE COMPANY, A CORPORATION OF OREGON.

STEAM CONNECTION.

Application filed June 14, 1926, Serial No. 115,743. Renewed November 20, 1928.

This invention relates to a steam connection.

The general object of the invention is to provide an improved means for connecting a source of power with a prime mover which is mounted to rotate.

One of the specific objects of the invention is to provide a novel means for connecting high pressure and exhaust steam pipes of a rotatably mounted engine with a relatively fixed boiler and condenser.

Another object of the invention is to provide a steam connection wherein the high pressure steam line through a portion of its length is surrounded by the exhaust steam lines.

Another object of the invention is to provide a connection for connecting a fixed boiler and a fixed condenser with a rotatably mounted engine and wherein the high pressure line and the exhaust line are mounted to rotate coaxially.

Other objects of the invention will be apparent from the following description taken in connection with the acompanying drawings wherein:

Fig. 1 is a central sectional view partly in elevation showing my improved steam connection;

Fig. 2 is a fragmentary detail showing a portion of a vessel equipped with my invention, and Fig. 3 is a section on line 3—3, Fig. 1.

Referring to the drawing by reference characters, I have shown a supporting base 10 which may be a deck of a vessel. Mounted upon this base, I show a frame work 11 which supports a bull ring 12. Upon this ring 12, I arrange rollers 14 which support a platform 15. The platform is prevented from tilting by laterally arranged rollers 15′. Mounted upon the platform 15, I show an engine 16. This engine 16 serves to rotate a crane 17 about the frame work 11. The engine 16 also serves to operate the boom 17′ and the cables 18 for lifting a load supported on the hook 19.

In order to supply steam to the engine 16 from a boiler, (not shown) the boiler is connected by means of a pipe 20 with a rotatable steam connecting device indicated generally at 21. This rotatable steam connecting device includes a central pipe or conduit 22 which is connected to a pipe 23 so that high pressure steam may be supplied to the engine 16.

The exhaust pipe 24 of the engine is connected to a hollow jacket 25 which surrounds the pipe 22. The jacket 25 terminates at 26 short of the end of the pipe 22 and the lower end of the jacket is rotatably mounted within a packing member 27. This packing member 27 includes an upper member or gland 28 which engages the hollow jacket and a lower member or gland 29 which engages the pipe 22. The lower portion of the pipe is rotatably held in steam-tight position by means of a packing gland 30. The member 27 includes a chamber 30′ which is below the end of the jacket 25. This chamber 30′ comunicates through a pipe 31 with a condenser (not shown).

The jacket is shown as provided with a flange 35 which serves to hold the steam connection in place. The jacket 25 and pipe 22 are connected by members 31′.

From the foregoing description it will be apparent that as the base 15 rotates the pipes 23 and 24 as well as the jacket 25, will rotate on this base. A guide member 36 is provided for preventing undue lateral movement of the jacket 25. This guide member is fixed and the jacket moves within the guide member. The packing member 27 and gland 30 are both fixed and the jacket 25 moves within the upper portion of the packing member 27 while the lower portion of the pipe 22 moves within the gland 30.

Having thus described my invention, I claim:

1. In a steam connection for a crane, a fixed base, a rotary platform thereon, an engine on said platform, cooperating means between said engine and a stationary boiler, said means including a packing member fixed to said base, a pipe communicating with said engine mounted on said platform and rotatable in said packing member, means to connect said pipe operatively to said boiler, cooperating means between said engine and a stationary condenser, said means including a pipe, said second pipe being in communication with the engine, a second packing member fixed to said base in which said second named pipe is mounted to rotate, a third pipe mounted on said last named packing member, and means to connect said last named pipe to the condenser.

2. In a steam connection for a crane, a fixed base, a rotary platform thereon, an engine on said platform, cooperating means between said engine and a stationary boiler remote from said platform, said means including a pipe communicating with said engine and mounted to rotate with said platform, said pipe being operatively connected to said boiler, means cooperating between said engine and a stationary condenser, said means including a jacket surrounding said pipe, said jacket being in communication with said engine, a stationary member in which said jacket is mounted to rotate, said stationary member having an annular chamber therein in communication with said jacket, a pipe mounted on said stationary member and in communication with said chamber, and means to connect operatively said last mentioned pipe to said condenser.

3. In a steam connection for a crane, a rotary platform, an engine on said platform, cooperating means between said engine and a stationary boiler remote from said platform to connect the same, said means including a pipe mounted to rotate with and upon the same axis as said platform, said pipe being in communication with said engine, a stationary member in which said pipe terminates, means affording communication between said first mentioned pipe and said boiler, a jacket surrounding said pipe and supporting the same, said jacket being supported on said platform and in communication with said engine, said jacket terminating in and in communication with a stationary member in which it is mounted to rotate, and means for affording communication between said last named stationary member and a stationary condenser remote from said platform.

4. In a steam connection for a crane, a fixed base, a rotary platform thereon, an engine on said platform, and means to connect said engine to a boiler and a pipe mounted to rotate upon the same axis as said platform, said pipe being in communication with said engine and terminating in a stationary member, a packing element in said member surrounding said pipe, a second pipe fixedly mounted on said member and affording communication from said stationary member to the boiler, a jacket surrounding and supporting said pipe, said jacket being supported on said platform, said jacket being in communication with said engine, said jacket terminating in a second stationary member in which it is mounted to rotate, and means for affording communication between said secondary stationary member and said condenser, said last named means including a packing element in said second stationary member surrounding said jacket and a pipe mounted thereon, said first mentioned pipe passing through said second stationary member and the packing element therein.

In testimony whereof, I hereunto affix my signature.

CHARLES W. DAUGHS.